United States Patent [19]

Duran

[11] Patent Number: 4,759,671
[45] Date of Patent: Jul. 26, 1988

[54] SELF-RETAINING BOLT ASSEMBLY
[75] Inventor: John A. Duran, Glendora, Calif.
[73] Assignee: Avibank Mfg., Inc., Burbank, Calif.
[21] Appl. No.: 906,295
[22] Filed: Sep. 11, 1986
[51] Int. Cl.$^4$ ............................................. F16B 21/00
[52] U.S. Cl. ................................... 411/347; 411/348
[58] Field of Search ................. 411/21, 347, 348, 351, 411/913; 24/453

[56] References Cited
U.S. PATENT DOCUMENTS

| | | | |
|---|---|---|---|
| 1,621,624 | 3/1927 | Campo | 411/347 |
| 2,361,491 | 10/1944 | Nagin | 411/347 |
| 2,945,411 | 7/1960 | Thompson | 411/351 |
| 3,561,516 | 2/1971 | Reddy | 411/347 |
| 4,433,854 | 2/1984 | Smith | 411/348 |
| 4,464,090 | 8/1984 | Duran | 411/103 |
| 4,655,657 | 4/1987 | Duran | 411/348 |

Primary Examiner—Neill Wilson
Attorney, Agent, or Firm—Poms, Smith, Lande & Rose

[57] ABSTRACT

A self-retaining bolt assembly including a bolt having a head, a shank, and a threaded end adapted to be inserted into a hole in a panel or the like for subsequent coupling to a nut on the blind side of a subpanel. The bolt includes a detent engaging one side of the panel in which the bolt is inserted with the head thereof on the opposite side of the panel. The hole for the detent is placed in the location on the bolt that allows maximum strength capability through both the grip area and through the thread area of the bolt. This is accomplished by the use of a locking element of detent that does not require a hole in the shear or threaded area of the bolt. A nut can then be threaded to the end of the bolt projecting through the panels.

18 Claims, 3 Drawing Sheets

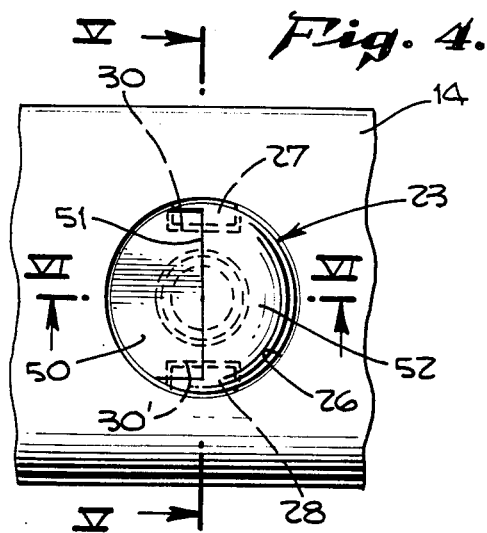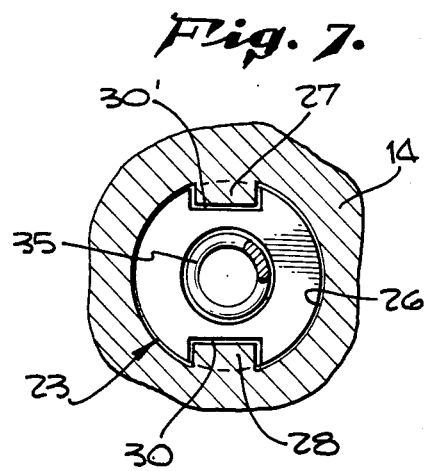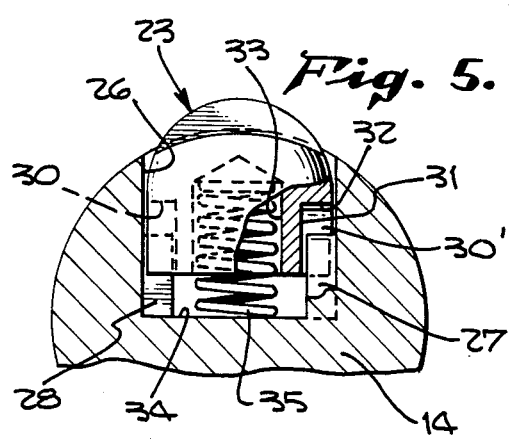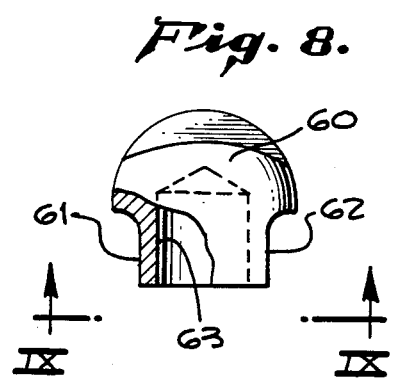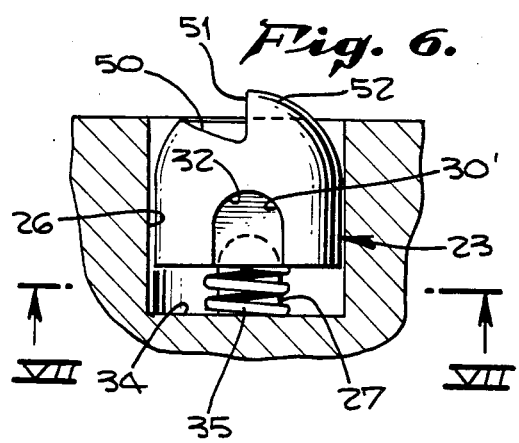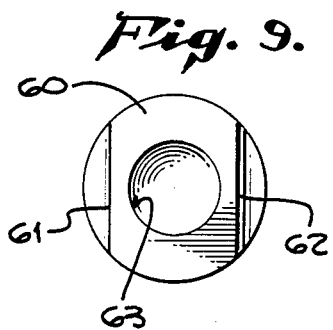

SELF-RETAINING BOLT ASSEMBLY

BACKGROUND OF THE INVENTION

1. Field of the Invention

The invention relates to self-retaining bolt assemblies; and, more particularly, to self-retaining bolts for use in aircraft and other similar installations.

2. Description of the Prior Art

Self-retaining bolts are well known in the aircraft industry. Such bolts are mounted in one panel and adapted to be selectively coupled to and disengaged from a mating member mounted in an adjacent panel. Such prior art bolts include means thereon for retaining the bolt to the panel in which it is installed so that it can't fall out during vibration or the like even if it is not connected to its mating member and for allowing subsequent easy release therefrom. One type of prior art bolt is disclosed in U.S. Pat. No. 3,561,516 to Reddy. In Reddy, the detents used as the means to retain the bolt in the panel must be carefully machined and properly oriented in one direction for proper installation. Further, a number of carefully machined parts are required including a passageway which extends through the inside diameter of the bolt shank and such an assembly weakens the bolt at a critical area in the bolt where the load is carried.

There is thus a need for a self-retaining bolt having means for retaining the bolt to the panel in which it is installed without weakening the bolt while permitting easy release therefrom. Such means should be easy to manufacture and install, require relatively few working parts and not require orientation in a fixed direction for assembly.

SUMMARY OF THE INVENTION

It is an object of this invention to provide a self-retaining bolt assembly with improved detent means for retaining the bolt to an installation panel.

It is a further object of this invention to provide a self-retaining bolt having means for retaining the bolt to a panel without weakening the bolt body.

It is still further an object of this invention to provide a self-retaining bolt assembly having detent means for holding the bolt of the assembly to a panel which assembly is made up of relatively few parts which can be assembled easily and quickly.

These and other objects are preferably accomplished by providing a self-retaining bolt having a head, a shank, and a threaded end adapted to be inserted into a hole in a panel or the like for subsequent coupling to a nut on the blind side of the sub-panel. The bolt includes a detent engaging the blind side of the panel in which the bolt is inserted with the head thereof on the opposite side of the panel. The hole for the detent is placed in a location on the bolt that allows maximum strength capability through both the grip area and through the threaded area of the bolt. This is accomplished by the use of a locking element or detent that does not require a hole in the shear or threaded area of the bolt. A nut can then be threaded to the bolt thereby securing the bolt to the panels.

BRIEF DESCRIPTION OF THE DRAWING

FIG. 4 is a view taken along lines IV—IV of FIG. 3;

FIG. 5 is a view taken along lines V—V of FIG. 4;

FIG. 6 is a view taken along lines VI—VI of FIG. 4;

FIG. 7 is a view taken along lines VII—VII of FIG. 6;

FIG. 8 is an elevation, partly sectional view, of a modification of the detent of FIGS. 1 to 7;

FIG. 9 is a view taken along lines IX—IX of FIG. 8;

DESCRIPTION OF THE PREFERRED EMBODIMENT

Figure 1:
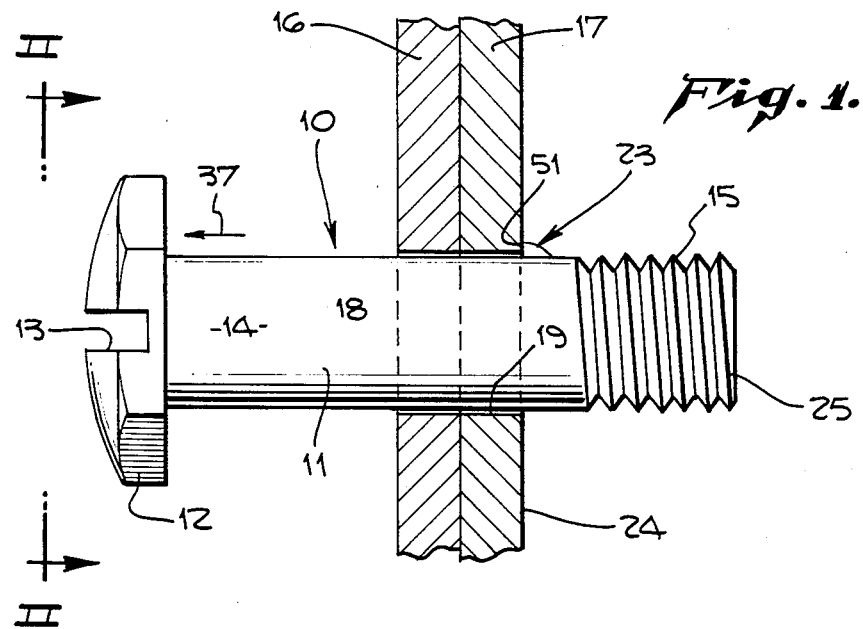
FIG. 1 is an elevational view showing the self-retaining bolt of the invention installed in a panel and sub-panel.
Figure 2:
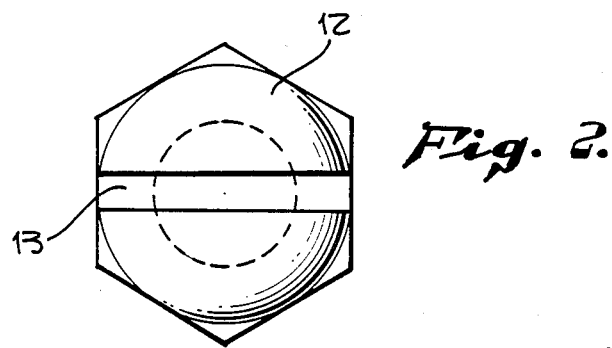
FIG. 2 is a view taken along lines II—II of FIG. 1.

Referring now to FIG. 1 of the drawing, a self-retaining bolt assembly 10 is shown comprising a bolt 11 having an enlarged head 12 which may be slotted as at slot 13 (FIG. 2) and hex-shaped as shown. Bolt 11 includes a generally cylindrical shank portion 14 extending from head 12 and an externally threaded end 15. Of course, end 15 may be internally threaded.

Figure 3:
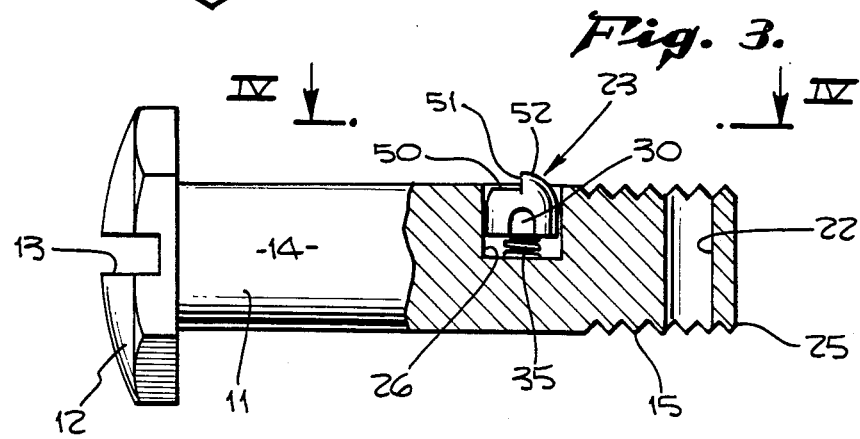
FIG. 3 is an elevational sectional view of the bolt alone of FIG. 1.

As seen in FIG. 3, a passageway 22 may be provided in end 15 for receiving a cotter pin or the like therethrough as will be discussed further hereinbelow. End 15 may terminate in a chamfered nose 25.

Bolt 11 is adapted to be inserted into aligned apertures 18, 19 extending through a panel 16, and a sub-panel 17, respectively, and be retained thereto. Accordingly, as particularly contemplated in the present invention, such means includes a spring biased detent 23 adapted to abut against face 24 of panel 17 to hold the bolt 11 to panels 16 and 17 as shown.

As seen in FIG. 3, a shallow cavity or hole 26 is provided in shank portion 14 adjacent end 15. This hole 26 extends only part way through the shank portion 14. A pair of diametrically opposite protuberances 27,28 (FIG. 7) are formed in hole 26 extending inwardly toward the central axis thereof. These protuberances 27,28 are preferably elongated and curved or domed at top as seen in FIG. 6 although any suitable configuration may be used.

Thus, as seen in FIGS. 3, 5 and 6, ball detent 23 is shown as a preferably solid spherically shaped ball element having diametrically opposite cut-out sections 30,30', each having a rear wall 31 and a curved upper wall 32 (FIGS. 5 and 6). As seen in FIGS. 4 to 7, these cut-out sections 30,30' are configured similarly to protuberances 27,28 (FIG. 7) and adapted to straddle the same, respectively.

Also, as seen in FIG. 3, ball detent 23 has a cut-out sector portion 52 at the top having a bottom wall 50 and a back wall 51. Wall 50 may be curved as seen in FIG. 6.

In assembling ball detent 23 to bolt 11, the detent 23 is placed into hole 26 with protuberances 27,28 entering cut-out sections 30,30' respectively, with spring 35 entering an opening 33 (FIG. 5) in ball detent 23 and thus being biased between detent 23 and the bottom wall 34 of hole 26. The opening of hole 26 is now peened about the periphery thereof, as is well known in the art, thus trapping ball detent 23 within hole 26. Ball detent 23 is biased therein as seen in FIGS. 3, 5 and 6 with the upper generally triangular-shaped sector portion 52 (FIG. 6)

being adapted to move down into hole 26 against the bias of spring 35. Wall 31 lies in a plane extending generally parllel to the axis of shaft portion 14 (FIG. 3). Wall 51 faces in the direction of head 12 away from end 15, the plane thereof being generally perpendicular to the axis of shaft portion 14. Thus, the protuberances 27,28 and mating sections 30,30' provide both quick assembly of the ball detent 23 and proper orientation therein so that wall 51 faces in the direction indicated. As seen in FIG. 1, wall 51 thus is in a position to abut against face 24 of sub-panel 17 and hold bolt 11 to the abutting panel 16 and sub-panel 17 in a self-retained or hold out position. If it were desired to release bolt 11 from panel 16 and sub-panel 17, the detent 23 is merely pushed inwardly in hole 26 until sector portion 52 enters hole 26 a sufficient distance to permit shank portion 11 to be pulled out of the aligned holes 18,19 in panel 16 and sub-panel 17 in the direction of arrow 37.

As heretofore discussed and can be appreciated by comparing FIG. 6 with FIG. 7, any suitable keying means may be used for keying the sections 30,30' of the ball detent 23 to the protuberances 27,28. For example, as seen in FIGS. 8 and 9, a ball detent 60, otherwise similar to detent 23, may have a pair of diametrically opposite cut-out sections 61,62 extending along each side thereof adapted to straddle like configured protrusions on the hole in which it is mounted. Also, detent 60 has an interior opening 63 for receiving a similar biasing means such as spring 35 therein.

Any suitable materials, such as spring steel, stainless steel, etc. may be used.

The head and shank configuration of bolt 11, and connection thereof to the nut 70 (as will be discussed) may vary so that other heads, e.g., with countersunk holes for coupling to a tool, tapered shafts, internally threaded shafts, etc. may be used.

Only a relatively shallow hole 26 is required and the protuberances 27, 28 strengthen the bolt 11 at the area where the load thereon is carried. The ball detent thus includes integral pawl means and eliminates the need for multiple carefully machined parts.

Thus, bolt 11 cannot be withdrawn from apertures 18, 19 due to engagement of detent 23 with the surface 24 of sub-panel 17. Of course, if it were desired to remove bolt 11 from panel 16 and sub-panel 17, one merely pushes in on detent 23 and pulls bolt 11 in the direction of arrow 37.

Figure 10:
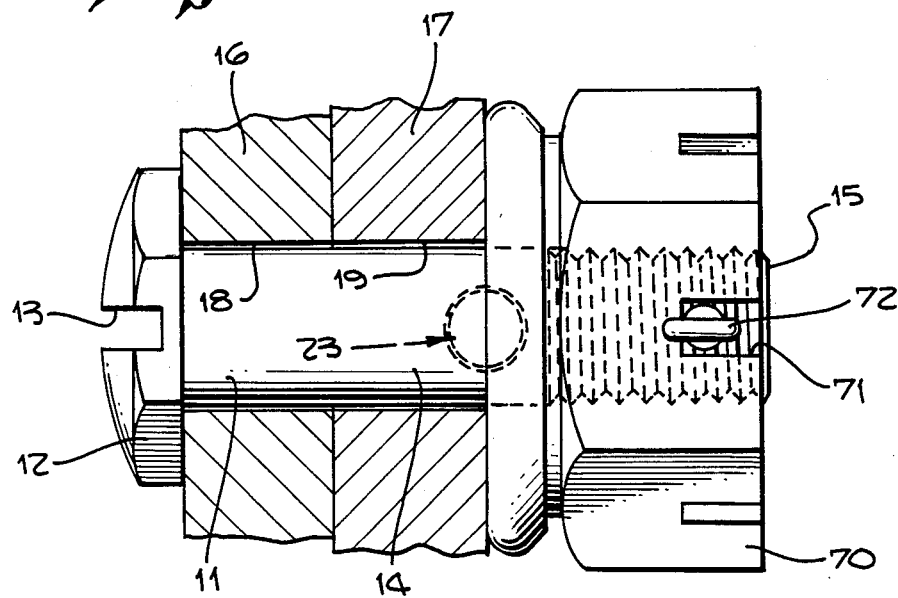
FIG. 10 is an elevational view of the final installed position of the bolt of the invention mounted to a nut on the blind side on the sub-panel.
Figure 11:
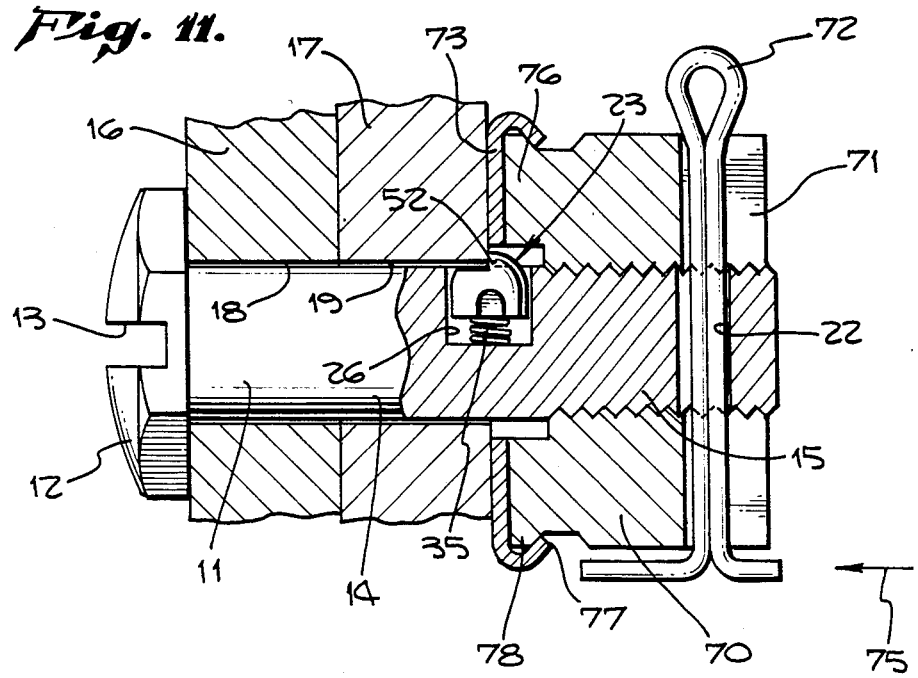
FIG. 11 is a cross-sectional view of the assembly of FIG. 10.

As seen in FIG. 10 and 11, nut 70 can now be threaded onto the threaded section 15 of bolt 11 and such nut may be a counterbored castellated self-locking nut thereby provided apertures 71 therethrough (FIG. 11) for receiving cotter pin 72 therethrough and through hole 22 in bolt 11 with the free ends bent as shown thus positively locking nut 70 to bolt 11. If it is desired to remove nut 70, pin 72 is withdrawn from nut 70 (after straightening the free ends), and nut 70 is unthreaded from section 15 and removed along with washer 73. Ball detent 23 can now be pushed downwardly against the bias of spring 35 until portion 52 clears aperture 19 and can then be pulled through the openings 18, 19 in the direction of arrow 75.

It can be seen that there is described an improved bolt which is self retaining and positive locking. The bolt will remain in place even if the cotter pin comes out or breaks off or if the pin or nut is left off completely or the nut backs off and unthreads during vibration.

Nut 70 may be a single unitary piece or, optionally, as shown in FIGS. 10 and 11, nut 70 may have an end skirt portion 76 surrounding and trapping therebetween detent 23. Washer 73 may have an enlarged terminal lip 77 may be provided with lip 77 surrounding an enlarged end 78 on nut 71 thereby being attached to nut 71 and movable therewith.

It can be seen that I have disclosed a self-retaining positive locking bolt which remains in place even if the cotter pin or nut is left off, or if the cotter pin breaks or the nut unthreads during use in high vibration environments.

The detent is simple to manufacture and assemble and easily and quickly oriented in the proper direction during assembly thereof.

Although I have described the fastener assembly with reference to certain preferred embodiments, it is to be understood that the appended claims describe the scope of the invention and various changes and modifications may occur to one skilled in the art without departing from the scope of the invention.

I claim:

1. In a self-retaining bolt assembly including a bolt having an enlarged head at one end, a threaded section at the other end and a shank portion between the head and the threaded section, the bolt being adapted to be inserted through aligned apertures in a first panel abutting against a sub-panel with the head on the access side of said panel, the shank portion including detent means for abutting against the blind side of the sub-panel having an aperture therein in which the bolt may be inserted to hold the bolt in a hold-out position with respect to the panel and sub-panel, the detent means being adapted to be disengaged from abutment with the sub-panel whereby the bolt can be removed from the aligned apertures, the threaded section being adapted to be threaded to a nut on the blind side of said sub-panel, the improvement which comprises:

said detent means including a hole partway through the shank portion of said bolt, the central longitudinal axis of said hole extending in a direction generally normal to the longitudinal axis of said shank portion, said shank portion being solid except for said hole, said shank portion being free of any longitudinally extending passageway or cross through passage in the area of the detent means along the interior length thereof, a detent disposed in said hole and loosely retained therein, detent withdrawal prevention means associated with the opening leading into the hole in which said detent is disposed to prevent withdrawal thereout, said detent having a face portion having a plane extending substantially perpendicular to the longitudinal axis of said shank portion, spring biasing means in said hole engaging said detent normally biasing said detent to a first position wherein said face portion extends out of said hole and allowing movement along an axis generally coincident with the central longitudinal axis of said hole against its bias to a second position wherein said face portion is disposed in said hole, and keying means keying said detent to said shank portion so that said detent is oriented so that its face portion faces the head of said bolt with the plane thereof extending substantially perpendicular to the longitudinal axis of said shank portion.

2. In the bolt assembly of claim 1 wherein said detent is a spherical ball having one sector cut out thereof, said face portion being the face of the ball formed by cutting out of the sector thereof.

3. In the bolt assembly of claim 2 wherein said keying means includes portions of said shank portion in said hole configured similarly to cut-out sections of said detent below the portion having said sector cut out thereof.

4. In the bolt assembly of claim 3 wherein said hole is generally cylindrical having an internal wall and extends to a position about midway through said shank portion.

5. In the bolt assembly of claim 4 wherein said portions of said shank portion are a pair of diametrically opposite elongated portions of said shank portion extending inwardly from the internal wall of said hole toward each other forming a space therebetween.

6. In the bolt assembly of claim 5 wherein said cut-out sections of said detent comprise a pair of diametrically opposite elongated sections of said detent extending through the outer wall of said detent inwardly thereof and spaced from each other, said detent being adapted to straddle said portions of said shank portion thereby keying the detent in said hole.

7. In the bolt assembly of claim 1 wherein said keying means includes portions of said shank portion in said hole configured similarly to cut-out sections of said detent below the portion having said sector cut out thereof.

8. In the bolt assembly of claim 1 including a aperture extending through said threaded section between said hole and the other end of said bolt, the longitudinal axis of said aperture extending in the same direction as the longitudinal axis of said hole and normal to the longitudinal axis of said bolt and lying in the same plane as the longitudinal axis of said hole, and a counterbored castellated self-locking nut threaded onto said threaded section of said bolt providing a plurality of openings for insertion of a cotter pin therethrough and through said aperture thereby positively retaining said nut to said bolt.

9. In a self-retaining bolt having an enlarged head at one end and a threaded end at the other with a shank portion therebetween, said shank portion including detent means adapted to extend out beyond the outer surface of said shank portion when in a first position and adapted to extend back into the shank portion of said bolt when in a second position, the improvement which comprises:

said detent means including a hole partway through the shank portion of said bolt, the central longitudinal axis of said hole extending in a direction generally normal to the longitudinal axis of said shank portion, said shank portion being solid except for said hole, said shank portion being free of any longitudinally extending passageway along the interior length thereof, or cross through passage in the area of the detent means, a detent disposed in said hole and loosely retained therein, detent withdrawal prevention means associated with the opening leading into the hole in which said detent is disposed to prevent withdrawal thereout, said detent having a face portion having a plane extending substantially perpendicular to the longitudinal axis of said shank position, spring biasing means in said hole engaging said detent normally biasing said detent to a first position wherein said face portion extends out of said hole and movable along an axis generally coincident with the central longitudinal axis of said hole to a second position wherein said face portion is disposed in said hole, and keying means keying said detent to said shank portion so that said detent is oriented so that its face portion faces the head of said bolt with the plane thereof extending substantially perpendicular to the longitudinal axis of said shank portion.

10. In the bolt of claim 9 wherein said detent is a spherical ball having one sector cut out thereof, said face portion being the face of the ball formed by cutting out of the sector thereof.

11. In the bolt of claim 10 wherein said keying means includes portions of said shank portion in said hole configured similarly to cut-out sections of said detent below the portion having said sector cut out thereof.

12. In the bolt of claim 11 wherein said hole is generally cylindrical having an internal wall and extends to a position about midway through said shank portion.

13. In the bolt of claim 12 wherein said portions of said shank portion are a pair of diametrically opposite elongated portions of said shank portion extending inwardly from the internal wall of said hole toward each other forming a space therebetween.

14. In the bolt of claim 13 wherein said cut-out sections of said detent comprise a pair of diametrically opposite elongated sections of said detent extending through the outer wall of said detent inwardly thereof and spaced from each other, said detent being adapted to straddle said portions of said shank portion thereby keying the detent in said hole.

15. In the bolt of claim 9 wherein said keying means includes portions of said shank portion in said hole configured similarly to cut-out sections of said detent below the portion having said sector cut out thereof.

16. In the bolt of claim 9 including an aperture extending through said threaded section between said hole and the other end of said bolt, the longitudinal axis of said aperture extending in the same direction as the longitudinal axis of said hole and normal to the longitudinal axis of said bolt and lying in the same plane as the longitudinal axis of said hole, and a counterbored castellated self-locking nut threaded onto said threaded section of said bolt providing a plurality of openings for insertion of a cotter pin therethrough and through said aperture thereby positively retaining said nut to said bolt.

17. In a self-retaining bolt assembly including a bolt having an enlarged head at one end, a threaded section at the other end and a shank portion between the head and the threaded section, the bolt being adapted to be inserted through aligned apertures in a first panel abutting against a sub-panel with the head on the access side of said panel, the shank portion including detent means for abutting against the blind side of the sub-panel having an aperture therein in which the bolt may be inserted to hold the bolt in a hold-out position with respect to the panel and sub-panel, the detent means being adapted to be disengaged from abutment with the sub-panel whereby the bolt can be removed from the aligned apertures, the threaded section being adapted to be threaded to a nut on the blind side of said sub-panel, the improvement which comprises:

said detent means including a hole in the shank portion of said bolt, a detent in the form of a spherical ball having one sector cut out thereof disposed in said hole and loosely retained therein, said ball having a face portion formed by the cutting out of the sector thereof having an plane extending substantially perpendicular to the longitudinal axis of said shank portion, spring biasing means in said hole engaging said detent normally biasing said detent to a first position wherein said face portion extends out of said hole and allowing movement against its bias to a second position wherein said face portion is disposed in said hole, and keying means keying said detent to said shank portion so that said detent is oriented so that its face portion faces the head of said bolt with the plane thereof extending substantially perpendicular to the longitudinal axis of said shank portion, said keying means including portions of said shank portion in said hole configured similarly to cut-out sections of said detent below the portion having said sector cut-out thereof, said hole being generally cylindrical having an internal wall and extending to a position about midway through said shank portion with said portions of said shank portion comprising a pair of diametrically opposite elongated portions of said shank portion extending inwardly from the internal wall of said hole toward each other forming a space therebetween.

18. In the bolt assembly of claim 17 wherein said cut-out sections of said detent comprise a pair of diametrically opposite elongated sections of said detent extending through the outer wall of said detent inwardly thereof and spaced from each other, said detent being adapted to straddle said portions of said shank portion thereby keying the detent in said hole.

* * * * *